United States Patent Office
3,033,897
Patented May 8, 1962

3,033,897
SYNTHESIS OF OXYGENATED CAROTENOIDS
Charles D. Robeson, Rochester, N.Y., assignor to Eastman Kodak Company, Rochester, N.Y., a corporation of New Jersey
No Drawing. Filed Mar. 23, 1960, Ser. No. 16,951
20 Claims. (Cl. 200—488)

This invention relates to the preparation of polyene compounds, and more particularly, to the preparation of pigmenting materials suitable for use in poultry feeds.

For food appeal or merchandizing purposes, it is desirable that poultry and related products not have a pale skin or lack coloration, but rather a more yellow or orangish to red skin coloration. Certain oxygenated carotenoids have been found to the useful for fortifying feeds which contain low levels of natural colorants such as xanthophyll resulting from the substitution of milo or other grains for colorant-containing corn and the like in many commercial feed mixtures. Such closely related hydrocarbon materials as β-carotene, while being useful for coloring such foods as margarine, do not have utility for pigmenting poultry.

It is an object of this invention to provide a new method for preparing polyene compounds.

It is another object of this invention to provide a new method for preparing oxygenated carotenoids suitable for use in poultry feeds as pigmenters.

It is another object of this invention to prepare by a novel method dialkoxy carotenoids.

It is another object of this invention to provide a novel method for preparing diacyloxy carotenoids.

It is still another object of this invention to prepare by a novel method dioxo carotenoids.

It is likewise another object of this invention to prepare oxygenated carotenoids by a novel one-step process.

These and other objects of the invention are attained by treating certain oxygenated polyene aldehyde compounds with phosphorus pentasulfide in an organic amine solvent medium under substantially anhydrous conditions at an elevated temperature and thereby forming an oxygenated carotenoid.

The oxygenated polyene aldehyde compounds that can be suitably employed as starting materials in the present process have the carbon structure of vitamin A aldehyde with an oxygen-containing radical substituent in the cyclic nucleus, and can be represented by the following structural formula:

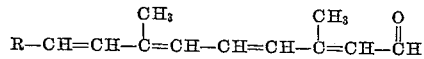

wherein R is an ionyl ring with an oxygen-containing radical substituent, and typically is a monovalent radical having the formula

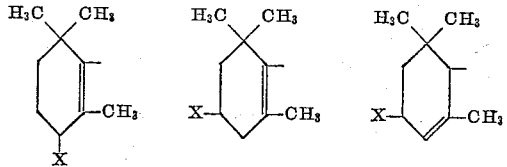

and wherein X is an oxygen-containing radical including oxygen atoms in the form of an oxo radical (=O), an alkoxy radical (—OR') wherein R' is an alkyl radical typically having 1 to 18 carbon atoms and preferably 1 to 4 carbon atoms, or an acyloxy radical

wherein R" is an alkyl radical typically having 1 to 18 carbon atoms and preferably 1 to 4 carbon atoms. The oxygenated polyene aldehyde reactants can be employed singly or in admixture. If only one oxygenated polyene aldehyde reactant is present, the product of the process is a symmetrical carotenoid. However, mixtures of various oxygenated polyene aldehyde reactants can be employed to prepare mixtures of symmetrical and unsymmetrical carotenoids, as the subject oxygenated polyene aldehydes are highly unsaturated, such compounds can exist in the form of various geometric isomers (i.e., cis and trans isomers) which characterize vitamin A-like compounds. I contemplate the use of any such geometric isomers in my process.

In accordance with the present process the oxygenated polyene aldehydes are treated with phosphorus pentasulfide in an organic amine solvent medium. The tertiary amines are preferred, pyridine being a particularly effective solvent medium, although primary and secondary amines can also be utilized. Other suitable amine solvents include 2-picoline, 3-picoline, 4-picoline, diethyl aniline, monoethyl aniline, aniline, quinoline, piperidine, morpholine, dimethylamine, 2,4-lutidine, 2,6-lutidine, 3,4-lutidine, and related well known amines. Likewise, mixtures of more than one amine solvent can be employed. The amount of solvent employed can be widely varied in accordance with usual practice. As phosphorus pentasulfide reacts with water, substantially anhydrous conditions are employed during the reaction.

The present reaction proceeds to form a carotenoid from the above-described oxygenated polyene aldehydes in the presence of relatively small amounts of the phosphorus pentasulfide. For highest conversions to the carotenoid product, desirably at least .2 mole, and usually .2 mole to 3 moles, of phosphorus pentasulfide for each mole of aldehyde reactant are employed.

The present reaction is effected at an elevated temperature, usually at least 35° C. and below the temperature at which substantial deterioration or decomposition of the oxygenated carotenoid reaction product takes place, with temperatures in the range of about 50° C. to 125° C. being more usually used and temperatures in the range of 80° C. to 120° C. being preferred. Under more commonly employed reaction conditions the reaction can be substantially completed in about 1 to 10 hours, although shorter or longer reaction periods may be desired depending on such reaction variables as the reaction temperature, the amount of agitation, the dilution of the reactants in the reaction solvent, and related reaction variables. The completion of the reaction can be determined by the infrared absorption spectrum of the reaction product.

The reaction product of the oxygenated polyene aldehyde and phosphorus pentasulfide can be worked up or purified by conventional methods. Typical of such methods being solvent extraction, crystallization, and chromatographic adsorption or combinations of more than one purification method.

In accordance with the present process, the carbon moieties of 2 molar proportions of certain oxygenated polyene aldehydes are joined together to form carotenoid compounds in a single process step as illustrated by the following equation:

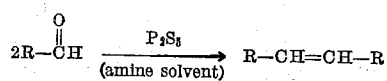

While such a reaction of the described oxygenated polyene aldehydes and phosphorus pentasulfide can be readily effected under the conditions described herein, that such a reaction proceeded in such a manner was quite unexpected. It is known in the art that ketones react with phosphorus pentasulfide to form thiones as represented by the following equation:

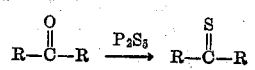

However, in the present process the carbon moieties of two oxygenated polyene aldehydes join with the splitting out of oxygen rather than the expected substitution of sulfur for oxygen in the aldehyde reactant to form a thial.

The present process is further illustrated by the following examples of preferred embodiments thereof. The ultraviolet data set out in the following examples were determined in ethanol.

*Example 1*

To a mixture of 0.5 g. of phosphorus pentasulfide and 4 ml. of pyridine was added a solution of 1 g. of 3-acetoxyvitamin A aldehyde in 8 ml. of pyridine containing 0.2 g. of hydroquinone. The 3-acetoxyvitamin A aldehyde reactant is described in Dutch Patent No. 25,284 and has the following formula:

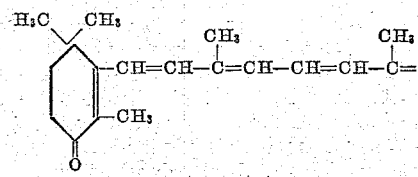

The resulting mixture was heated at 100° C. for 1.5 hours while a slow stream of nitrogen was bubbled therethrough. An additional 0.4 g. of phosphorus pentasulfide was then added and the reaction mixture heated for an additional 4.5 hours at 100° C. After cooling, the resulting solution was decanted from an insoluble mass into 100 ml. of diethyl ether and this ether solution then washed successively with 10% sulfuric acid, water, 0.5 N potassium hydroxide and again with water. After drying over anhydrous sodium sulfate, the solvent was evaporated to give 814 mg. of a 4,4'-diacetoxy-β-carotene concentrate having E (1%, 1 cm.) (465 mμ)=420, 4,4'-diacetoxy-β-carotene having the following formula

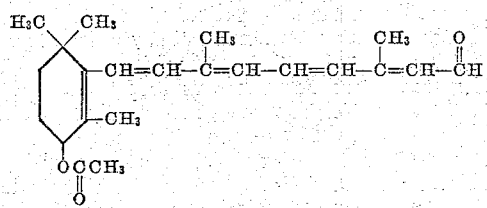

Similarly, 3,3'-diacetoxy-β-carotene can be prepared if 4-acetoxyvitamin A aldehyde is substituted for the 3-acetoxyvitamin A aldehyde.

*Example 2*

To a mixture of 0.18 g. of phosphorus pentasulfide and 2 ml. of pyridine was added a 4 ml. pyridine solution containing 0.34 g. of a 3-oxovitamin A aldehyde concentrate having E (1%, 1 cm.) (292 mμ, 375 mμ)=307, 1126 and 0.1 g. of hydroquinone. The 3-oxovitamin A aldehyde reactant is described in J. Chem. Soc., page 4909 (1957), and has the following formula

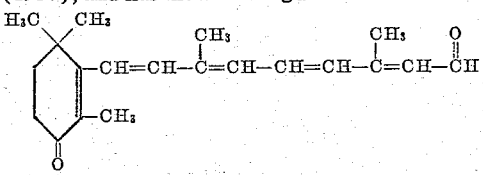

After heating the resulting mixture for 1.5 hours at 100° C. under nitrogen, an additional 0.14 g. of phosphorus pentasulfide was added and the heating continued at 100° C. for 4.5 hours. The resulting reaction mixture was then worked up by the method described in Example 1 to give 254 mg. of a canthaxanthin concentrate having E (1%, 1 cm.) (475 mμ)=361, canthoxanthin having the formula

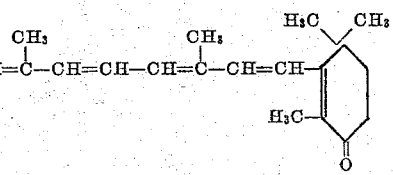

Similarly, 3,3'-dioxo-β-carotene can be prepared if 4-oxovitamin A aldehyde is substituted for the 3-oxovitamin A aldehyde.

*Example 3*

A. To a mixture of 0.99 g. of phosphorus pentasulfide in 10 ml. of pyridine was added a solution of 20 ml. of pyridine containing 1.8 g. of a 3-methoxyvitamin A aldehyde concentrate having E (1%, 1 cm.) (372 mμ)= 1088 and 0.3 g. of hydroquinone. The 3-methoxyvitamin A aldehyde reactant has the following formula

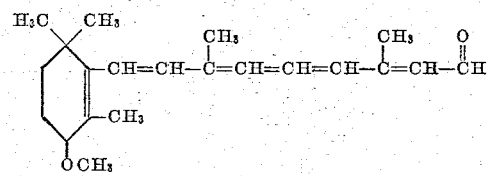

and can be prepared by the method described hereinbelow in part "B" of this example. The resulting mixture was heated on a steam bath for one hour. An additional 0.99 g. of phosphorus pentasulfide was added and the steam bath heating was continued for another hour. After cooling, the soluble portion of the reaction mixture was taken up in diethyl ether and the ether solution washed successively with 10% sulfuric acid, 0.5 N potassium hydroxide and then with water. The ether solution was then dried over anhydrous sodium sulfate, filtered, and the solvent removed by evaporation to yield 0.74 g. of a 4,4'-dimethoxy-β-carotene concentrate as a glassy red solid having E (1%, 1 cm.) (445 mμ)=410. The product was further concentrated by chromatography on a column of aluminum oxide to produce a product having E (1%, 1 cm.) (448 mμ)=660. The 4,4'-dimethoxy-β-carotene product had the following formula

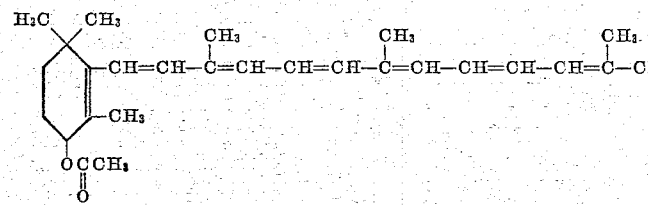

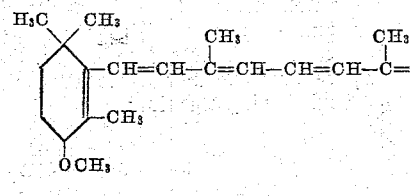

B. Five grams of crystalline all-trans vitamin A aldehyde was dissolved in a mixture of 30 ml. chloroform and 2 ml. anhydrous methanol. This solution was cooled to 0° C. and treated with 3.15 g. N-bromosuccinimide in a mixture of 150 ml. of chloroform and 4 ml. of methanol also at 0° C. The solution was allowed to stand at 0° for 5 min., and then treated with 7.5 g. N-ethymorpholine. The solution was allowed to warm to room temperature over a 3 hr. period, diluted with 300 ml. diethyl ether and washed successively with cold 10% HCl, 0.5 N. KOH and water. The solution was dried with anhydrous sodium sulfate and evaporated. The yield of product was 6.04 g. This material was dissolved in 100 ml. of petroleum ether (boiling 30–60° C.), and chromatographed on 350 g. sodium aluminum silicate adsorbent ("Doucil"). A weakly adsorbed orange zone near the bottom of the column gave, on elution with diethyl ether, 2.0 g. of unreacted vitamin A aldehyde, E (1%, 1 cm.) (378 mμ)=1245. A more strongly adsorbed yellow zone was eluted to give 3.04 g. of a 3-methoxyvitamin A aldehyde concentrate with E (1%, 1 cm.) (372 mμ)=1194.

*Example 4*

To a mixture of 0.59 of phosphorus pentasulfide in 5 ml. of diethyl aniline was added a solution of 1.1 g. of 3-methoxyvitamin A aldehyde concentrate having E (1%, 1 cm.) (372 mμ)=1588 and 0.259 of hydroquinone in 10 ml. of diethyl aniline. After heating the resulting mixture for 1.25 hours on a steam bath, 0.59 of phosphorus pentasulfide was added and the steam bath heating continued for another 1.25 hours. The resulting reaction mixture was worked up as described in Example 1 and a 4,4'-dimethoxy-β-carotene concentrate (1.0 g.) having E (1%, 1 cm.) (443 mμ)=240 was obtained.

*Example 5*

To a mixture of 0.5 g. of phosphorus pentasulfide and 4 ml. of monoethyl aniline was added a solution of 1 g. of 3-methoxyvitamin A aldehyde and 0.2 g. of hydroquinone in 6 ml. of monoethyl aniline. The resulting mixture was heated for 1.5 hours on a steam bath, then 0.4 g. more of phosphorus pentasulfide added, and the steam bath heating continued for 3 more hours. On working up the reaction mixture as described in Example 1, a 4,4'-dimethoxy-β-carotene preparation having a reddish glassy color and having E (1%, 1 cm.) (450 mμ)=67 was obtained. Similar results are obtained if aniline is employed as the organic amine solvent in lieu of the monoethyl aniline.

*Example 6*

A. A mixture of 0.99 g. of phosphorus pentasulfide, 1.8 g. of 3-lauroxyvitamin A aldehyde in 30 ml. of pyridine reacted as described in Example 3 yields the oxygenated carotenoid, 4,4'-dilauroxy-β-carotene. The 3-lauroxyvitamin A aldehyde reactant has the formula

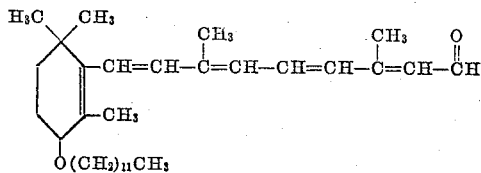

and the oxygenated carotenoid has the formula

B. The reactant, 3-lauroxyvitamin A aldehyde, was prepared as follows. To a solution of 5 g. of all-trans vitamin A aldehyde and 2 ml. of lauryl alcohol in 30 ml. of chloroform at 0° C. was added a cold (0° C.) solution consisting of 3.15 g. of N-bromosuccinimide and 4 ml. of lauryl alcohol in 150 ml. of chloroform. After 6 minutes, 7.5 g. of N-ethyl morpholine was added to the reaction mixture and the solution allowed to warm to room temperature over a period of 3 hours. After diluting with 100 ml. of diethyl ether, the resulting solution was washed successively with 10% sulfuric acid, 0.5 N potassium hydroxide, and finally with water, and thereafter dried over anhydrous sodium sulfate. The residue obtained after evaporating the solvent was chromatographed on a column of 500 g. of sodium aluminum silicate adsorbent ("Doucil") to give 4.7 g. of a strongly adsorbed fraction of 3-lauroxyvitamin A aldehyde having E (1%, 1 cm.) (275 mμ)=733. A second similar chromatographing raised the E (1%, 1 cm.) value to 887. The infrared absorption curve of the prepared sample showed the presence of the carbonyl and ether groups.

*Example 7*

A. A mixture of carotenoid pigmenting materials was prepared from a mixture of oxygenated polyene aldehydes prepared as described in part "B" of this example having E (1%, 1 cm.) (373 mμ)=715 and consisting essentially of compounds indicated to have the formulas

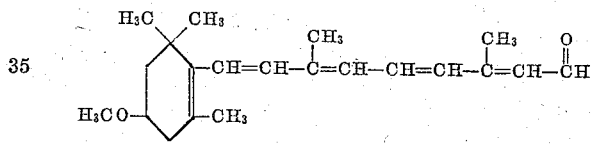

and

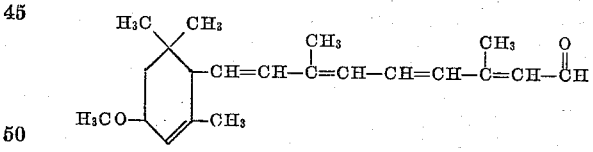

A 3 g. portion of this mixture of oxygenated polyene aldehydes and 1.4 g. of hydroquinone in 38 ml. of pyridine were added to a mixture of 3.9 g. of phosphorus pentasulfide in 18 ml. of pyridine, and the resulting reaction mixture heated for 2 hours at 95° C. in a nitrogen atmosphere. Thereafter, the pyridine layer was separated by decanting, diluted with 100 ml. of diethyl ether and then washed successively with 10% sulfuric acid, .5 N potassium hydroxide, and water. After drying over anhydrous sodium sulfate, the solvent was removed under vacuum to give 2.1 g. of reddish solid material having E (1%, 1 cm.) (440 mμ)=200 and comprising a mix-

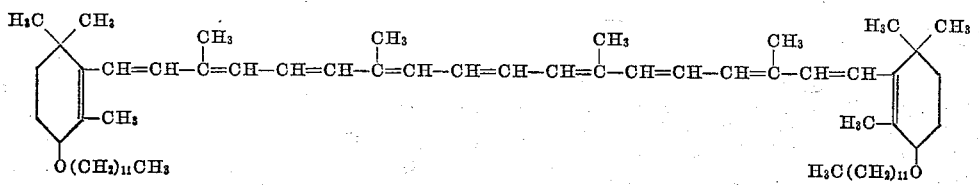

ture of 3,3'-dimethoxy-α-, β- and ε-carotenes indicated to have the formulas

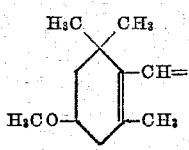 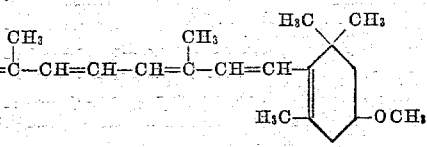

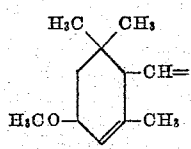 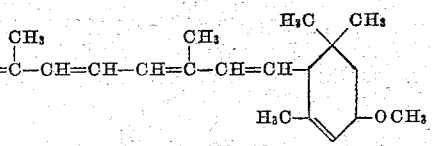

and

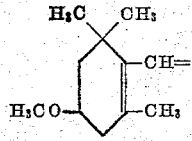 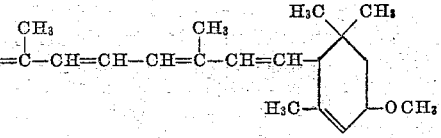

B. The mixture of oxygenated polyene aldehydes used to prepare the carotenoid pigmenting materials of part "A" of this example were prepared as follows. To 19.2 g. of α-ionone in 140 ml. of carbon tetrachloride was added 18 g. of dibromoethylmethylhydantoin. The mixture was swirled and heated until a vigorous reaction occurred. When the reaction subsided, the mixture was refluxed 2 minutes, rapidly cooled to 15° C., and filtered from the solid ethylmethylhydantoin in the reaction mixture into a solution of 12.3 g. of anhydrous sodium acetate in 125 ml. of methanol. The ethylmethylhydantoin on the filter was washed with 50 ml. carbon tetrachloride, and 50 ml. more of methanol were added to the combined filtrate and washings, which were simmered 2.5 hours and let stand at room temperature overnight (about 18 hours). The resulting reaction product was then worked-up by water dilution and extraction with diethyl ether to give 24.8 g. of an oil which was chromatographed on alumina from petroleum ether (boiling 30–60° C.). The lower zone of the chromatographic column containing unreacted α-ionone was washed through the column and discarded, and the main zone of the chromatographic column eluted to give 18.8 g. of an oil having E (1%, 1 cm.) (225 mμ, 281 mμ)=458,138 and a strong ether and weak acetate ester bands in its infrared spectrum. The resulting product was let stand at room temperature overnight (about 18 hours) in 100 ml. of .5 N potassium hydroxide in 90% ethanol. The resulting 16.7 g. of oil was chromatographed from petroleum ether (boiling 30–60° C.) on a 3.7 x 60 cm. sodium aluminium silicate ("Doucil") column. A lower yellow zone was washed through the column, giving 12.2 g. of an orange oil having E (1%, 1 cm.) (223 mμ, 287 mμ)=382,230. The infrared spectrum of the orange oil showed the presence of a conjugated ketone at 5.95μ, a conjugated double bond at 6.18μ, a methoxy group at 9.11μ, and a trans-double bond at 10.17μ, confirming that the material was composed of methoxyionones. Based on the analysis, the prepared product was indicated to be a mixture of 4-methoxy-α-ionone and 4-methoxy-β-ionone. The resulting methoxyionones were then converted to the mixture of oxygenated polyene aldehydes used in the present process by the general method described in Humphlett and Burness U.S. Patent No. 2,676,990 for preparing vitamin A aldehyde from β-ionone as follows. A 10 g. portion of the prepared methoxyionones was reacted with 5.85 g. of propargyl bromide and 1.2 g. of magnesium turnings in about 35 ml. of diethyl ether. The reaction was effected by warming to gentle reflux with stirring for about 5 minutes, the heat removed and the reaction controlled with an ice bath to a gentle reflux for about 30 minutes. Thereafter heat was applied and the reaction mixture gently refluxed 30 minutes more. The resulting magnesium complex was decomposed with 5% sulfuric acid. The resulting propynyl carbinols were then converted to acetylenic diol acetals by condensing with 7.2 g. of 4,4'-dimethoxy-2-butanone in the presence of ethylmagnesium bromide in about 100 ml. of diethyl ether by refluxing for about 5 hours, and the resulting complex decomposed with 5% sulfuric acid to produce acetylenic diol acetals. The acetylenic diol acetals were purified by chromatographing on a sodium alumina silicate adsorbent ("Doucil"), to yield an 8.2 g. purified fraction which was selectively reduced to olefinic diol acetals with hydrogen over .82 g. of 5% palladium catalyst on carbon in 82 cc. of butanone-2 containing .41 ml. of quinoline. The reduction was effected in about 20 minutes at about room temperature. After removal of the hydrogenation catalyst by filtration, the resulting olefinic diol acetals were refluxed in the presence of .62 ml. of quinoline and .72 ml. of hydrochloric acid in about 50 ml. of methyl ethyl ketone. The resulting mixture of oxygenated polyenealdehydes having E (1%, 1 cm.) (373 mμ)=715 were then reacted with phosphorus pentasulfide to prepare the mixture of carotenes as described above in part "A" of this example.

*Example 8*

The oxygenated carotenoids prepared in accordance with the process of the invention have utility as additives to poultry feed to produce pigmentation of broilers and egg yolks. The oxygenated carotenoids described in the preceding examples when employed in the feed formulation described below at levels of 36 mg. per pound of feed, and fed to chickens ad libitum for one week following a depletion period of 3 weeks on a pigment-free diet, impart a light yellow to orangish pigmentation to the skin of the chickens. Chickens fed on the same diet in the absence of such oxygenated carotenoids, or if β-carotene is substituted for the oxygenated carotenoids, have a pale skin. The feed formulation minus the described additives is as follows:

| Ingredient: | Amount, percent |
|---|---|
| Ground white hominy | 71.795 |
| Soybean meal | 15.64 |
| Meat scrap | 5.0 |
| Calcium carbonate | 4.0 |
| Molasses | 2.0 |
| Dicalcium phosphate | 1.0 |
| Iodized salt | .375 |
| Vitamin A and D feeding oil | .125 |
| Vitamin concentrate (water soluble) | .04 |
| Manganese sulfate | .025 |
| | 100.000 |

| | | |
|---|---|---|
| Potassium iodide | g./ton | 5.5 |
| D-activated animal sterol | do | 6.7 |

Thus the present invention provides a novel, simplified, one-step method for preparing polyene carotenoids, and more specifically, oxygenated carotenoids from less complex polyene aldehydes.

Conventional nomenclature is used herein with respect to the numbering of the oxygenated radical on the cyclic nucleus of the polyene aldehyde reactants and the carotenoid products. The numbering of the substituents in the cyclic ring of the polyene aldehyde reactants is as follows,

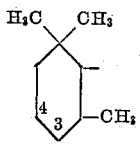

while the numbering of the substituents in the cyclic rings of the carotenoid products is as follows,

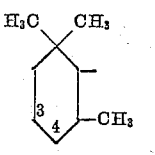

As used herein, the term "ionyl ring" is a monovalent radical having the carbon structure

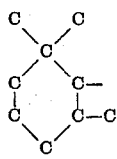

Although the invention has been described in detail with particular reference to certain typical embodiments, it will be understood that variations and modifications can be effected within the spirit and scope of the invention as described hereinabove and as defined in the appended claims.

and

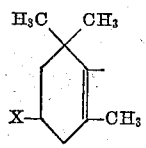

wherein X is an oxygen-containing radical selected from the group consisting of oxo radicals having the formula =O, alkoxy radicals and acyloxy radicals with phosphorus pentasulfide in an organic amine solvent medium under substantially anhydrous conditions at an elevated temperature to form an oxygenated carotenoid having the formula

said elevated temperature being below the temperature at which substantial decomposition of said oxygenated carotenoid occurs.

2. The process which comprises treating an oxygenated polyene aldehyde having the formula

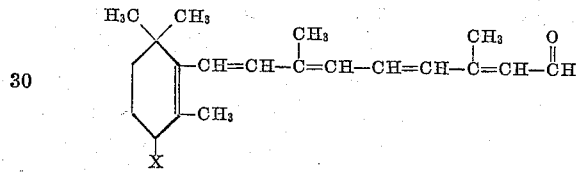

wherein X is an oxygen-containing radical selected from the group consisting of oxo radicals having the formula =O, alkoxy radicals having the formula —OR′ wherein R′ is an alkyl radical having 1 to 18 carbon atoms and acyloxy radicals having the formula $$-O\overset{O}{\underset{\|}{C}}R''$$

wherein R″ is an alkyl radical having 1 to 18 carbon atoms with phosphorus pentasulfide in an organic amine solvent medium under substantially anhydrous conditions at a temperature in the range of 35° C. to 125° C. to form an oxygenated carotenoid having the formula

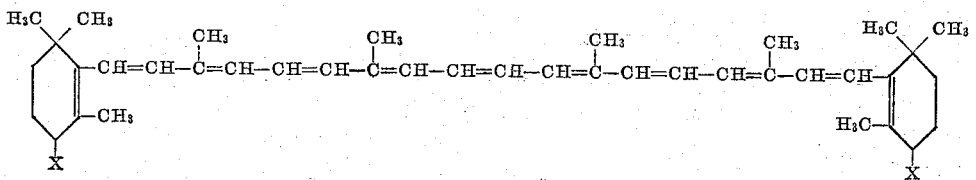

I claim:
1. The process which comprises treating an oxygenated polyene aldehyde having the formula

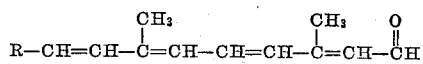

wherein R is an ionyl ring having a formula selected from the group consisting of

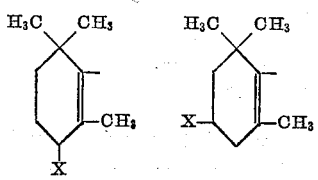

3. The process which comprises treating an oxygenated polyene aldehyde having the formula

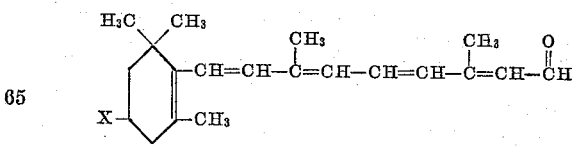

wherein X is an oxygen-containing radical selected from the group consisting of oxo radicals having the formula =O, alkoxy radicals having the formula —OR′ wherein R′ is an alkyl radical having 1 to 18 carbon atoms and acyloxy radicals having the formula

wherein R" is an alkyl radical having 1 to 18 carbon atoms with phosphorus pentasulfide in an organic amine solvent medium under substantially anhydrous conditions at a temperature in the range of 35° C. to 125° C. to form an oxygenated carotenoid having the formula

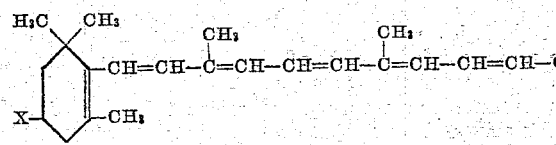

4. The process which comprises treating an oxygenated polyene aldehyde having the formula

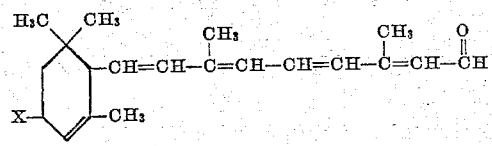

wherein X is an oxygen-containing radical selected from the group consisting of oxo radicals having the formula =O, alkoxy radicals having the formula —OR' wherein R' is an alkyl radical having 1 to 18 carbon atoms and acyloxy radicals having the formula

wherein R" is an alkyl radical having 1 to 18 carbon atoms with phosphorus pentasulfide in an organic amine solvent medium under substantially anhydrous conditions at a temperature in the range of 35° C. to 125° C. to form an oxygenated carotenoid having the formula

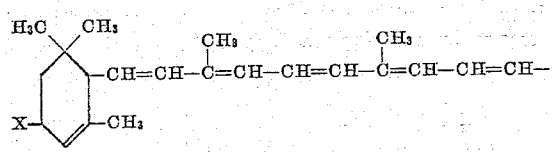

5. The process according to claim 1 wherein the amine solvent medium is a tertiary amine.

6. The process according to claim 1 wherein the amine solvent medium is pyridine.

7. The process which comprises treating 3-methoxyvitamin A aldehyde with phosphorus pentasulfide in an organic amine solvent medium under substantially anhydrous conditions at a temperature in the range of 50° C. to 125° C. to form 4,4'-dimethoxy-β-carotene.

8. The process which comprises treating 4-methoxyvitamin A aldehyde with phosphorus pentasulfide in an organic amine solvent medium under substantially anhydrous conditions at a temperature in the range of 50° C. to 125° C. to form 3,3'-dimethoxy-β-carotene.

9. The process which comprises treating 3-oxovitamin A aldehyde with phosphorus pentasulfide in an organic amine solvent medium under substantially anhydrous conditions at a temperature in the range of 50° C. to form 4,4'-dioxo-β-carotene.

10. The process which comprises treating 3-acetoxyvitamin A aldehyde with phosphorus pentasulfide in an organic amine solvent medium under substantially anhydrous conditions at a temperature in the range of 50° C. to 125° C. to form 4,4'-diacetoxy-β-carotene.

11. The process which comprises treating an oxygenated polyene aldehyde having the formula

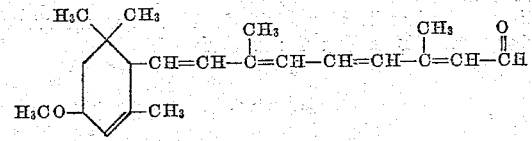

with phosphorus pentasulfide in an organic amine solvent medium under substantially anhydrous conditions of a temperature in the range of 50° C. to 125° C. to form 3,3'-dimethoxy-ε-carotene.

12. The process which comprises treating an oxygenated polyene aldehyde having the formula

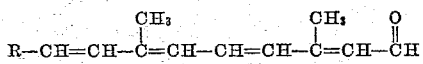

wherein R is a mixture of monovalent radicals having the formulas

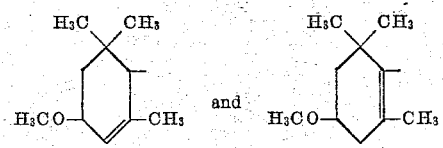

with phosphorus pentasulfide in an amine solvent medium under substantially anhydrous conditions at a temperature in the range of 50° C. to 125° C. to form a mixture comprising 3,3'-dimethoxy-α-carotene, 3,3'-dimethoxy-β-carotene and 3,3'-dimethoxy-ε-carotene.

13. The process which comprises treating 3-methoxyvitamin A aldehyde with at least .2 mole of phosphorus pentasulfide for each mole of 3-methoxyvitamin A aldehyde in a pyridine solvent medium under substantially anhydrous conditions at a temperature in the range of 80° C. to 120° C. to form 4,4'-dimethoxy-β-carotene.

14. The process which comprises treating 3-methoxyvitamin A aldehyde with at least .2 mole of phosphorus pentasulfide for each mole of 3-methoxyvitamin A aldehyde in a diethyl aniline solvent medium under substantially anhydrous conditions at a temperature in the range of 80° C. to 120° C. to form 4,4'-dimethoxy-β-carotene.

15. The process which comprises treating 3-methoxyvitamin A aldehyde with at least .2 mole of phosphorus pentasulfide for each mole of 3-methoxyvitamin A aldehyde in a monoethyl aniline solvent medium under substantially anhydrous conditions at a temperature in the range of 80° C. to 120° C. to form 4,4'-dimethoxy-β-carotene.

16. The process which comprises treating 4-methoxyvitamin A aldehyde with at least .2 mole of phosphorus pentasulfide for each mole of 4-methoxyvitamin A aldehyde in a pyridine solvent medium under substantially anhydrous conditions at a temperature in the range of 80° C. to 120° C. to form 3,3'-dimethoxy-β-carotene.

17. The process which comprises treating 3-oxovitamin A aldehyde with at least .2 mole of phosphorus pentasulfide for each mole of 3-oxovitamin A aldehyde in a pyridine solvent medium under substantially anhydrous conditions at a temperature in the range of 80° C. to 120° C. to form 4,4'-dioxo-β-carotene.

18. The process which comprises treating 3-acetoxyvitamin A aldehyde with at least .2 mole of phosphorus pentasulfide for each mole of 3-acetoxyvitamin A aldehyde in a pyridine solvent medium under substantially anhydrous conditions at a temperature in the range of 80° C. to 120° C. to form 4,4'-diacetoxy-β-carotene.

19. The process which comprises treating an oxygenated polyene aldehyde having the formula

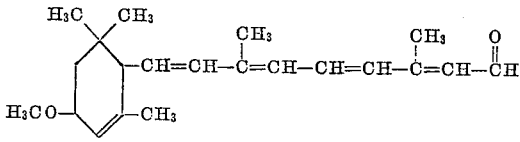

with at least .2 mole of phosphorus pentasulfide for each mole of said oxygenated polyene aldehyde in a pyridine solvent medium under substantially anhydrous conditions at a temperature in the range of 80° C. to 120° C. to form 3,3'-dimethoxy-ε-carotene.

20. The process which comprises treating an oxygenated polyene aldehyde having the formula

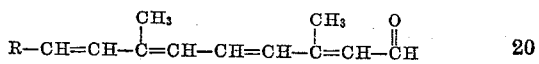

wherein R is a mixture of monovalent radicals having the formula

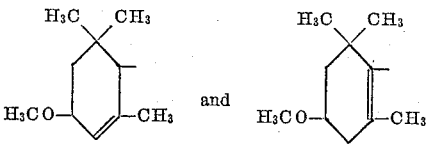

with at least .2 mole of phosphorus pentasulfide for each mole of said oxygenated polyene aldehyde in a pyridine solvent medium under substantially anhydrous conditions at a temperature in the range of 80° C. to 120° C. to form a mixture comprising 3,3'-dimethoxy-α-carotene, 3,3'-dimethoxy-β-carotene, and 3,3'-dimethoxy-ε-carotene.

No references cited.

UNITED STATES PATENT OFFICE
CERTIFICATE OF CORRECTION

Patent No. 3,033,897

May 8, 1962

Charles D. Robeson

It is hereby certified that error appears in the above numbered patent requiring correction and that the said Letters Patent should read as corrected below.

Column 10, lines 2 to 7, the formula should appear as shown below instead of as in the patent:

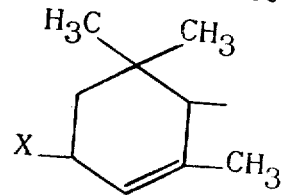

Signed and sealed this 9th day of October 1962.

(SEAL)
Attest:

ERNEST W. SWIDER
Attesting Officer

DAVID L. LADD
Commissioner of Patents